United States Patent
Nakamae

(10) Patent No.: US 8,283,592 B2
(45) Date of Patent: Oct. 9, 2012

(54) LASER WELDING METHOD

(75) Inventor: Kazuo Nakamae, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 313 days.

(21) Appl. No.: 12/762,084

(22) Filed: Apr. 16, 2010

(65) Prior Publication Data

US 2010/0270275 A1    Oct. 28, 2010

(30) Foreign Application Priority Data

Apr. 23, 2009  (JP) ................. 2009-105265

(51) Int. Cl.
*B23K 11/00* (2006.01)

(52) U.S. Cl. ........... 219/117.1; 219/121.63; 219/121.64; 219/121.65

(58) Field of Classification Search ............... 219/117.1, 219/121.63, 121.64, 121.65
See application file for complete search history.

(56) References Cited

U.S. PATENT DOCUMENTS

| 2003/0085202 A1* | 5/2003 | Niessner .................... 219/117.1 |
| 2004/0065406 A1* | 4/2004 | Chen et al. ................. 156/272.8 |
| 2006/0194009 A1* | 8/2006 | Tajima ......................... 428/35.2 |
| 2006/0196856 A1* | 9/2006 | Onose et al. ............. 219/121.63 |

FOREIGN PATENT DOCUMENTS

| JP | 2001-47221 | * | 2/2001 |
| JP | 2007-326140 | * | 12/2007 |
| JP | 2008-000793 | | 1/2008 |
| JP | 2008-055456 | | 3/2008 |

* cited by examiner

*Primary Examiner* — Tan N Tran
(74) *Attorney, Agent, or Firm* — Venable LLP; Michael A. Sartori; Steven J. Schwarz

(57) ABSTRACT

The present invention relates to a laser welding method of welding an electrode and a cable core to each other satisfactory by irradiation of a laser beam, even when the core is thin and the area of the electrode is small. The laser welding method welds on a substrate the electrode and the core of a coaxial cable to each other by irradiation of the laser beam. The core is sandwiched between a pressing member and the electrode, while the electrode and the core are brought into contact with each other at a connection section. The pressing member is a member that is transparent to the processing laser beam. A part of the core is molten by radiating the laser beam from the pressing member side. As a result, the electrode and the core are connected with each other.

9 Claims, 5 Drawing Sheets

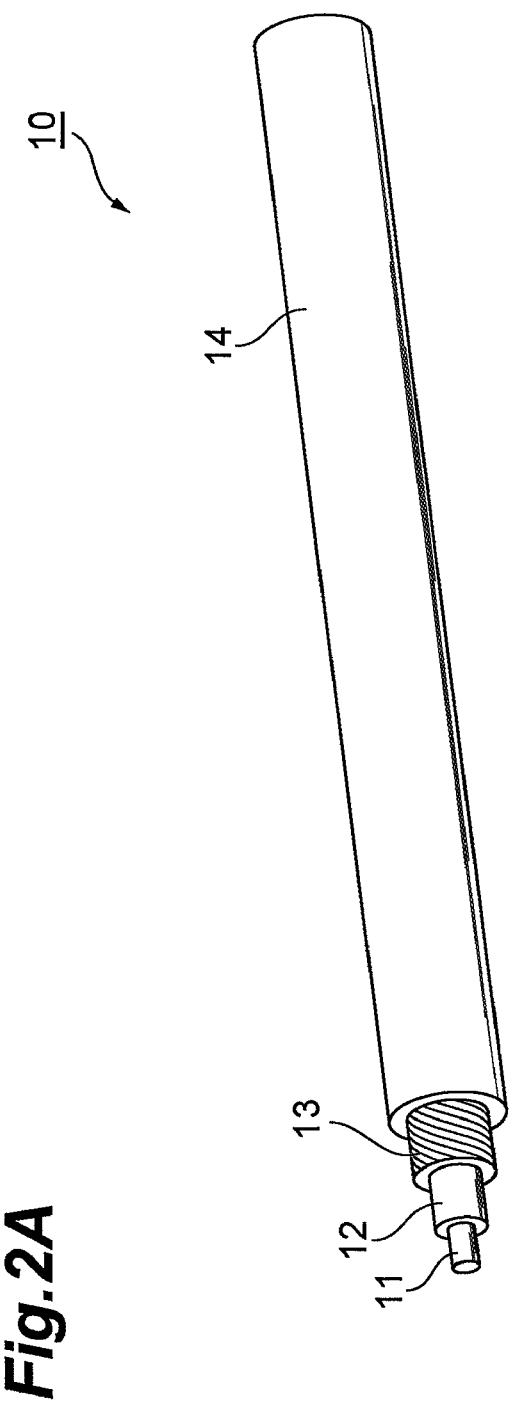
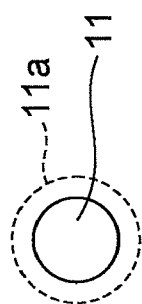

LASER WELDING METHOD

BACKGROUND OF THE INVENTION

1. Field of the Invention

The present invention relates to a method of welding an electrode and a cable core to each other by irradiation with a laser beam.

2. Related Background Art

Japanese Patent Application Laid-Open No. 2008-55456 (Document 1) and Japanese Patent Application Laid-Open No. 2008-793 (Document 2) disclose inventions that relate to a method of connecting an electrode and a core with each other by irradiation with a laser beam. The invention disclosed in Document 1 connects an electrode on a substrate and a core of a coaxial cable with each other by irradiation with a laser beam while the electrode and the core are in contact with each other. The invention disclosed in Document 2 connects an electrode and a core with each other by irradiation with a laser beam while the position of the core is secured to the electrode by a fixture. The fixture used here has, on one of the principal surfaces thereof, has a recessed part larger than the diameter of the core. The position of the core is secured to the electrode by disposing the core in a space that is generated when bringing this principal surface of the fixture into contact with the electrode surface.

SUMMARY OF THE INVENTION

The present inventors have examined the above prior art, and as a result, have discovered the following problems.

Namely, because the invention disclosed in Document 1 simply brings the electrode and the core into contact with each other, the soft core bends easily as the diameter of the core decreases, causing a connection failure easily. The invention disclosed in Document 2, on the other hand, connects the electrode and the core with each other by irradiation of a laser beam while the position of the core is secured to the electrode. Therefore, problems that could be caused by bending the core can be solved.

In the invention disclosed in Document 2, however, when the area of the electrode decreases as the diameter of the core decreases, the area of contact between the fixture for securing the position of the core and the electrode becomes small, making it difficult to secure the core to the electrode by using this fixture. As a result, a connection failure occurs easily due to the weak fixation.

The present invention has been developed to eliminate the problems described above. It is an object of the present invention to provide a laser welding method that is capable of welding an electrode and a cable core to each other well by irradiation of a laser beam even when the core is thin and the area of the electrode is small.

A laser welding method according to the present invention is a method of welding an electrode and a cable core to each other by irradiation of a laser beam, having the steps of: bringing the electrode and the core into contact with each other at a connection section; pressing a pressing member against the electrode to sandwich the core between the pressing member and the electrode; and melting a part of the core by radiating the laser beam from the pressing member side, to connect the electrode and the core with each other. Note that the pressing member transmits the laser beam and is therefore made from a transparent material that is transparent to the laser beam.

In the laser welding method according to the present invention, it is preferred that the transparent material be comprised of a silica glass or a heat-resistant resin, and that the pressing member have a space for transmitting the laser beam.

In the laser welding method according to the present invention, it is preferred that a metallic thin layer having a melting point lower than that of copper be disposed between the core and the pressing member and that the laser beam be radiated thereto. It is also preferred that the metallic thin layer be a plated layer formed on a surface of the core.

In the laser welding method according to the present invention, it is preferred that a periphery of the connection section including a portion in which the electrode and the core are connected with each other be covered with a resin.

In the laser welding method according to the present invention, it is preferred that the electrode and the core be connected with each other by radiating the laser beam to dissolve the part of the core under a nitrogen atmosphere. Furthermore, it is preferred that the electrode and the core be connected with each other by radiating the laser beam to dissolve the part of the core under an oxygen atmosphere.

In the laser welding method according to the present invention, it is preferred that concavity and convexity be formed on a surface of at least one of the electrode and the core before connecting the electrode and the core with each other by irradiation of the laser beam. It is also preferred that at least one of the electrode and the core be heated into an unmelted state by means of irradiation of the laser beam or heat of a heater, before connecting the electrode and the core with each other by irradiation of the laser beam.

BRIEF DESCRIPTION OF THE DRAWINGS

FIGS. 2A and 2B are views showing configurations of a coaxial cable;

DESCRIPTION OF THE PREFERRED EMBODIMENTS

Figure 1:
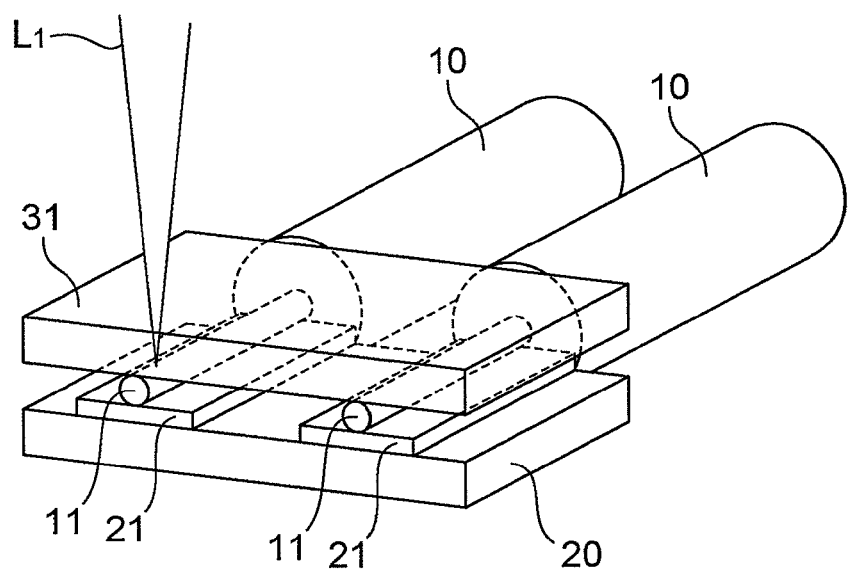
FIG. 1 is a view for explaining a first embodiment of a laser welding method according to the present invention.

In the following, embodiments of the laser welding method according to the present invention will be explained in detail with reference to FIGS. 1, 2A to 3C, 4 and 5. In the description of the drawings, identical or corresponding components are designated by the same reference numerals, and overlapping description is omitted.

First Embodiment

FIG. 1 is a view for explaining a first embodiment of the laser welding method according to the present invention. A laser welding method according to the first embodiment is a method of welding an electrode 21 on a substrate 20 and a core 11 of a coaxial cable 10 to each other by irradiation of a laser beam. More specifically, this laser welding method brings the electrode 21 and the core 11 into contact with each other at a connection section, presses a pressing member 31 transmitting a laser beam $L_1$ against the electrode 21 to sandwich the core 11 between the pressing member 31 and the electrode 21, and melts a part of the core 11 by radiating the laser beam $L_1$ from the pressing member 31 side, to connect the electrode 21 and the core 11 with each other.

As shown in FIG. 2A, the coaxial cable 10 has an insulator 12, shield 13 and jacket 14 sequentially around the core 11 located in the center of the coaxial cable 10. The core 11 has a diameter of 75 μm and is obtained by, for example, twisting seven copper wires, each having a diameter of 25 μm. In some cases a plurality of the coaxial cables 10 are arranged parallel. Sometimes, for example, forty-eight coaxial cable cables 10 are disposed parallel at approximately 300 μm pitch. Prior to the connection of the electrode 21 with the core 11, the insulator 12, the shield 13 and the jacket 14 are removed by laser processing or the like in a predetermined range on one end side of the coaxial cable 10, whereby the core 11 is exposed.

It is preferred that, for example, a metallic thin layer having a melting point lower than that of copper be disposed between the core 11 and the pressing member 31. In other words, as shown in FIG. 2B, the metallic thin layer may be a plated layer 11a formed on a surface of the core 11.

The electrode 21 may not only be an electrode of a circuit board but also be an electrode within a connector. The electrode 21 is, for example, 150 μm in width and 2 mm in length and comprised of copper.

It is preferred that, prior to the connection of the electrode 21 with the core 11, the laser beam be radiated to the core 11 and the electrode 21 while flowing nitrogen gas, to remove natural oxide films on the surfaces of the electrode 21 and the core 11, and that concavity and convexity on the surfaces for the purpose of increasing the area of contact therebetween.

Figure 3A:
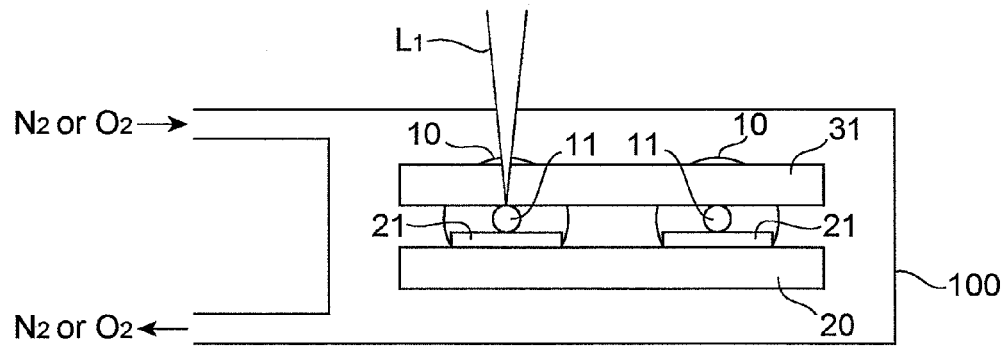
FIGS. 3A to 3C are views for explaining a condition of a periphery of a connection section before and after irradiation of a laser beam.
Figure 3B:
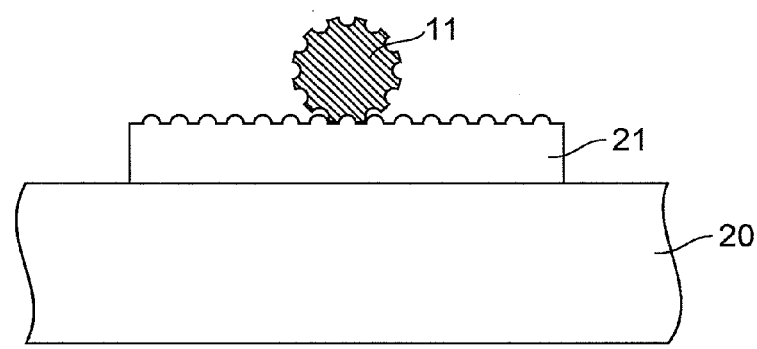

In particular, as shown in FIG. 3A, the core 11 and the electrode 21 that are in contact with each other (FIG. 1) are placed within a container 100, and the nitrogen gas (or oxygen gas) is injected into this container 100. In addition, by radiating the laser beam while rolling the core 11 on the electrode 21, the concavity and convexity are formed on the surfaces of the core 11 and the electrode 21, as shown in FIG. 3B. Examples of a laser light source used here are preferably a YAG laser (with 1.06 μm wavelength, 20 W/s, 20 ns pulses), fiber laser, and semiconductor laser.

The pressing member 31 is comprised of a material that is transparent at the wavelength of the laser beam $L_1$ used for laser welding (transparent material). This transparent material is preferably comprised of a silica glass or a heat-resistant resin. The heat-resistant resin may have heat resistance to low-melting-point metal, and preferably, for example, CYTOP (registered trademark)—amorphous fluorine resin— manufactured by Asahi Glass Co., Ltd is used.

The position of the core 11 is secured by sandwiching the core 11 between the pressing member 31 and the electrode 21, where the core 11 and the electrode 21 are connected with each other securely. In a state where the core 11 is sandwiched between the pressing member 31 and the electrode 21, the laser beam $L_1$ is radiated from the pressing member 31 side to melt a part of the core 11, where by the electrode 21 and the core 11 are connected with each other.

In so doing, for example, the laser beam $L_1$ is condensed and radiated to the electrode 21 and the core 11 by a lens with a focal length of 100 mm, and accordingly the electrode 21 and the core 11 are heated and molten. When connecting the cores 11 of the plurality of coaxial cables 10 arranged parallel with the electrodes 21 corresponding to these cores 11, the position where the laser beam $L_1$ is condensed and radiated is scanned to each connecting position. The laser beam $L_1$ is preferably radiated under a nitrogen atmosphere for the purpose of inhibiting the oxidation of the electrode 21 and the core 11.

In the present embodiment, even when the core 11 is thin and the area of the electrode 21 is small, the laser beam $L_1$ can be radiated onto the core 11 through the pressing member 31 by securing the core 11 by pressing the core 11 against the electrode 21 using the pressing member 31. Therefore, the electrode 21 and the core 11 can be welded to each other well by irradiation of the laser beam $L_1$.

Figure 3C:
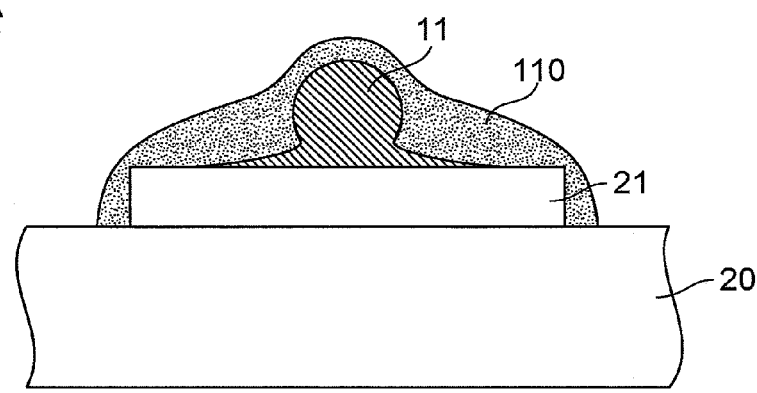

It is preferred that the periphery of the connection section including a region where the electrode 21 and the core 11 are connected with each other be covered with a resin 110, as shown in FIG. 3C. Covering with the resin 110 the periphery of the connection section between the partially molten core 11 and the electrode 21 can ensure the mechanical strength.

When materials like copper that have a great heat conduction and high melting points are used as the materials of the electrode 21 and the core 11, it is preferred that a tin foil or lead foil, which is a low-melting-point metal, be sandwiched between the electrode 21 and the core 11 beforehand. It is also preferred that the electrode 21 and the core 11 be plated with the low-melting-point metal. When the core 11 is not plated, in place of nitrogen, oxygen is preferably introduced to create an oxygen atmosphere at the time of laser heating, and the core 11 and the electrode 21 are preferably welded to each other at high temperature by using the oxidation heat.

Figure 4:
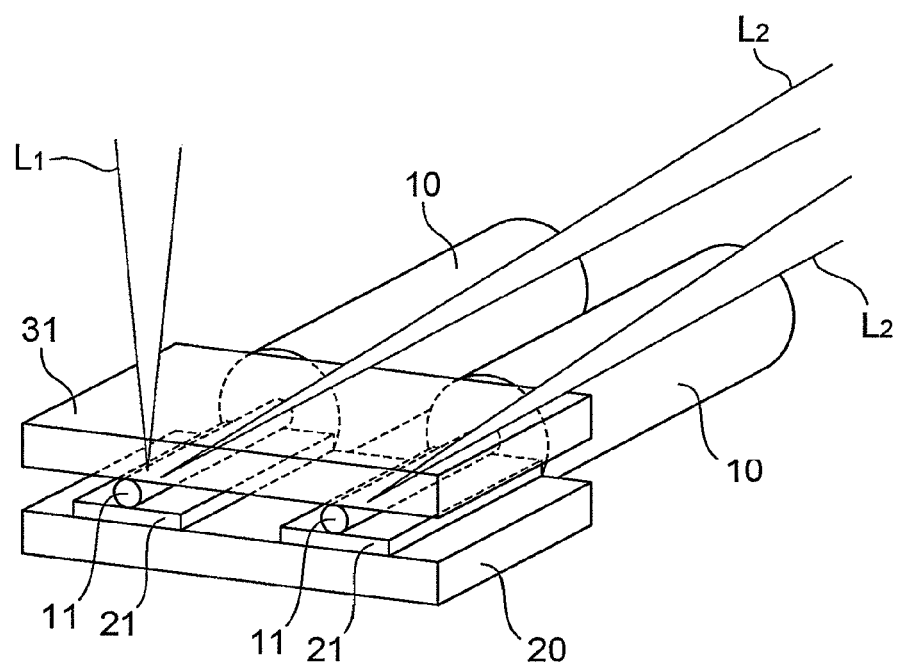
FIG. 4 is a view for explaining a modification of the laser welding method according to the first embodiment.

When the core 11 and the electrode 21 cannot be welded to each other under the oxygen atmosphere, it is preferred that another laser beam $L_2$ be condensed and radiated to the electrode 21 and the core 11 to heat the electrode 21 and the core 11 from prior to and during the radiation of the welding laser beam $L_1$, as shown in FIG. 4. For example, the welding laser beam $L_1$ is a YAG laser (with 1.06 μm wavelength, 80 W/s, 5 m pulses/second), while the heating laser beam $L_2$ is a semiconductor laser (with 50 W/s and a wavelength of 808 nm). Note that the heating may be carried out using a heater. By preheating the electrode 21 and the core 11 in this manner, the electrode 21 and the core 11 can be connected with each other even when the intensity of the welding laser beam $L_1$ is low, and consequently the damage of, for example, the pressing member 31 caused by the radiation of the laser beam $L_1$ can be reduced.

Suppose that, when welding the 75 μm-diameter core 11 obtained by twisting seven copper wires, each having a diameter of 25 μm, to the copper electrode 21, the fiber laser $L_1$ (with a wavelength of 1.06 μm) that is 80-W/s continuous light is condensed and radiated by using a lens with a focal length of 100 mm, to weld the core 11 and the electrode 21 to each other. When the temperature of the core 11 is high, irradiation time is preferably 6 milliseconds or less so that the core 11 is not broken. When the temperature of the core 11 is low, in consideration of the effects of melting and heat conduction of the core 11, the irradiation time is set at 3 milliseconds or less to confirm in advance whether the core 11 can be connected with the electrode 12 without melting.

When the result cannot be obtained, and when the core 11 does not melt even when the irradiation time is increased to 6 milliseconds or more, there is a possibility that the oxide film on the surface is thick. Therefore, it is preferred that the oxide film on the surface be removed by irradiating with a pulse YAG laser under the nitrogen atmosphere. The case where the core 11 does not dissolve due to the lack of intensity of the laser $L_1$ can be considered. In this case, therefore, the core 11 can be welded by radiating the laser beam $L_1$ under the oxygen atmosphere. When connecting a thin line such as the core 11 with the electrode 21, a camera of five magnifications or more can be used for observing contact points between the core 11 and the electrode 21 prior to welding, and, when the part on the core 11 that needs to be welded is far from the electrode 21, the pressing member can be used so that the core 11 and the electrode 21 can be brought into contact with each other and welded to each other.

Moreover, for the copper wires, the copper wires are heated until the welding point reaches near 1085° C., which might dissolve an epoxy substrate or a polyimide substrate on which the electrode 21 is disposed, due to the heat conduction. In such a case, the surfaces of the copper wires 11 and of the copper electrode 21 are plated with tin (having a melting point of 232° C.) or the like as a low-melting-point metal in order to weld the copper wires 11 to the copper electrode 21 even at a low melting point, whereby the copper wires 11 and the copper electrode 21 can be connected with each other at possibly the low melting point when welding these plated surfaces.

Second Embodiment

Figure 5:
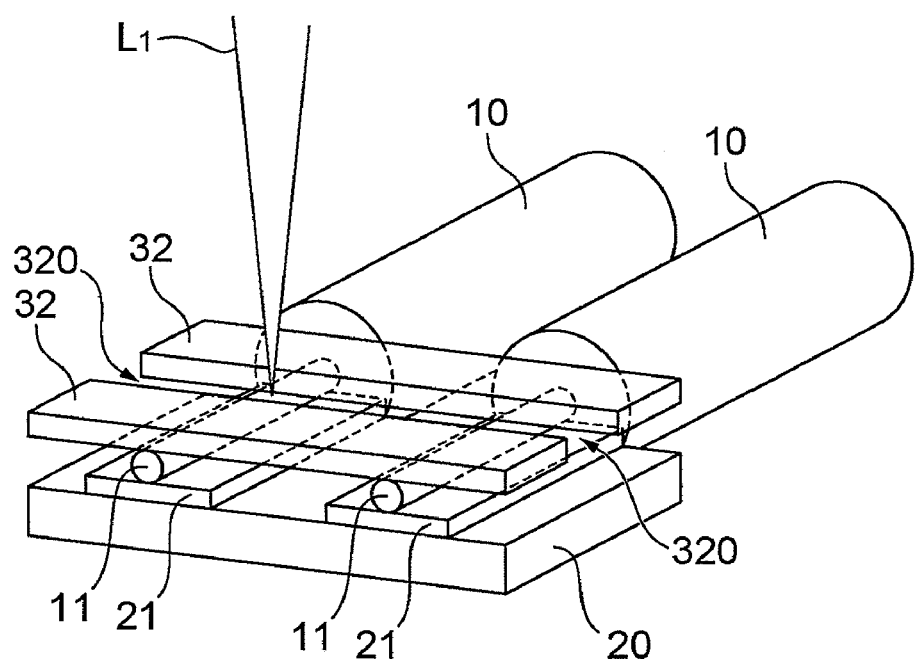
FIG. 5 is a view for explaining a second embodiment of the laser welding method according to the present invention.

FIG. 5 is a view for explaining a second embodiment of the laser welding method according to the present invention. The difference with the first embodiment is that the second embodiment uses a pressing member 32 in place of the pressing member 31, but the rest are the same. In the first embodiment, the laser beam $L_1$ for welding the electrode 21 and the core 11 to each other passes through the pressing member 31. In the second embodiment, on the other hand, a space 320 where the laser beam $L_1$ passes through the pressing member 32 is provided, and the laser beam $L_1$ is condensed and radiated to the electrode 21 and the core 11 through the space.

The pressing member 32 is obtained by performing photolithography on a transparent material comprised of a silica glass or a heat-resistant resin, and has a slit serving as the space for allowing the passage of the laser beam $L_1$. The width of the slit is, for example, 100 μm to 500 μm. The electrode 21 and the core 11 are brought into contact with each other, and the pressing member 32 is pressed against the periphery of the connection section to sandwich the core 11 between the pressing member 32 and the electrode 21. The laser beam $L_1$ passing through the slit of the pressing member 32 is radiated to melt a part of the core 11, whereby the electrode 21 and the core 11 are connected with each other.

In the present embodiment, because the laser beam $L_1$ passes through the slit formed on the pressing member 32, it is possible to prevent the pressing member 32 from deteriorate due to tarnish thereof by irradiation of the laser beam, so that stable laser welding can be accomplished.

What is claimed is:

1. A laser welding method of welding an electrode and a cable core to each other by irradiation of a laser beam, the method comprising the steps of:

bringing the electrode and the core into contact with each other at a connection section;

pressing a pressing member, which is comprised of a material transparent to the laser beam, against the electrode to sandwich the core between the pressing member and the electrode; and melting a part of the core by radiating the laser beam from the pressing member side, to connect the electrode and the core with each other, wherein the laser beam is radiated in a state in which a metallic thin layer having a melting point lower than that of copper is disposed between the core and the pressing member.

2. The laser welding method according to claim 1, wherein the pressing member is comprised of a silica glass or a heat-resistant resin.

3. The laser welding method according to claim 1, where the pressing member has a space for allowing passage of the laser beam.

4. The laser welding method according to claim 1, wherein the metallic thin layer is a plated layer formed on a surface of the core.

5. The laser welding method according to claim 1, wherein a periphery of the connection section including a portion in which the electrode and the core are connected with each other is covered with a resin.

6. The laser welding method according to claim 1, wherein the electrode and the core are connected with each other by radiating the laser beam to dissolve the part of the core under a nitrogen atmosphere.

7. The laser welding method according to claim 1, wherein the electrode and the core are connected with each other by radiating the laser beam to dissolve the part of the core under an oxygen atmosphere.

8. The laser welding method according to claim 1, wherein concavity and convexity are formed on a surface of at least one of the electrode and the core before connecting the electrode and the core with each other by irradiation of the laser beam.

9. The laser welding method according to claim 1, wherein at least one of the electrode and the core is heated before connecting the electrode and the core with each other by irradiation of the laser beam.

* * * * *